3,197,312
PROCESS FOR PREPARING RECONSTITUTABLE
FOOD PRODUCTS
Dave Eolkin, San Lorenzo, Calif., assignor to Gerber
Products Company, Fremont, Mich.
Filed Feb. 26, 1963, Ser. No. 261,565
4 Claims. (Cl. 99—204)

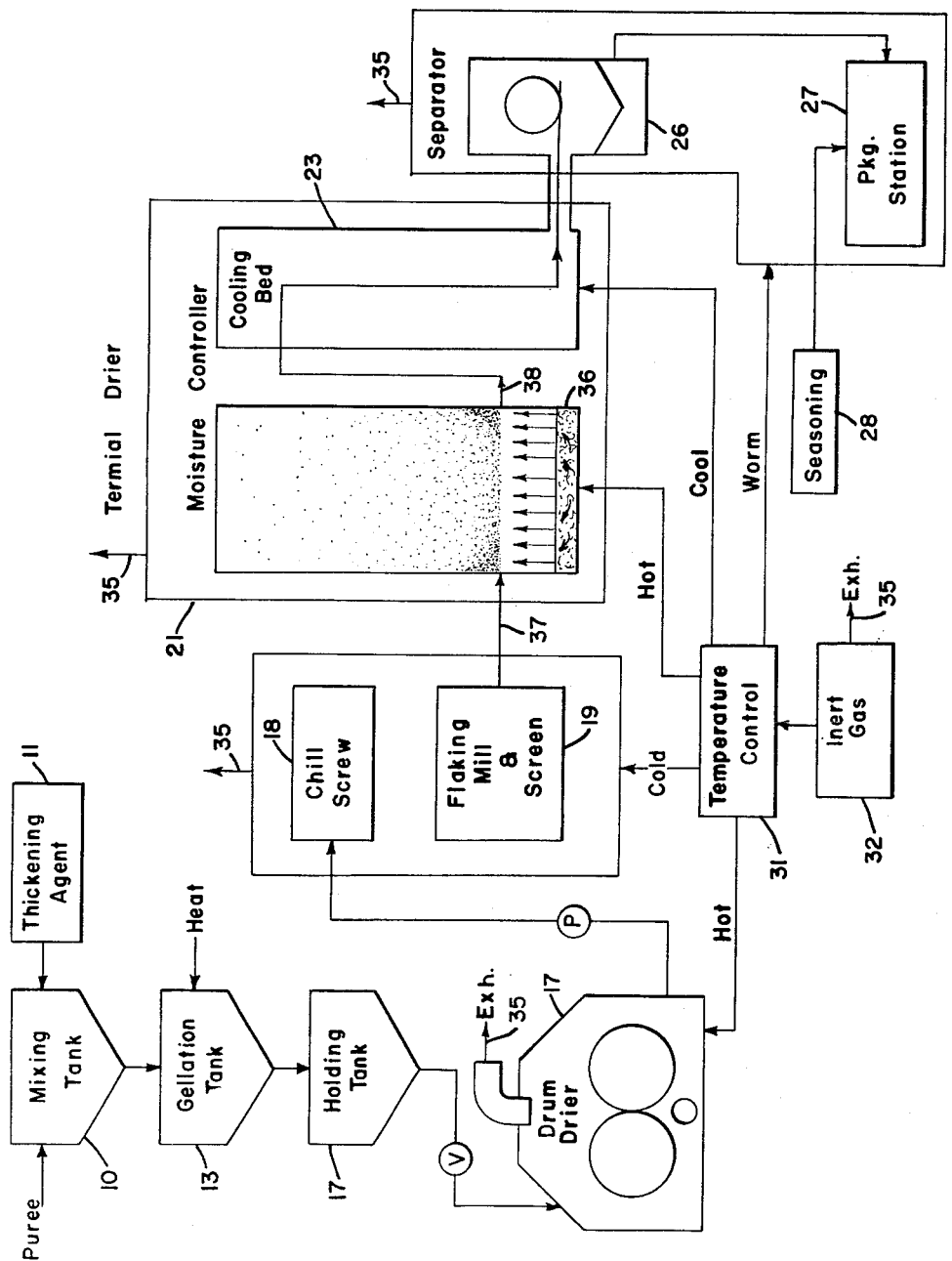

This application is a continuation-in-part of patent application Serial No. 46,553, filed August 1, 1960 and patent application Serial No. 35,494, filed June 13, 1960, both of said applications now abandoned.

This invention relates to a method for processing fruits, vegetables, soups and other products to produce equivalent reconstitutable food products.

The production of dry food products which are reconstitutable without losing their original texture, flavor, color and nutritive content creates a number of problems. While many more or less successful attacks on the processing of instant food products have been made in the past, one of the continuing difficulties is the removal of a sufficient amount of moisture to maximize shelf life without adversely affecting the consistency, flavor, color or nutritive content of the reconstituted product. While various processes employing drum driers have been developed to provide reconstituted food products which closely approximate the original products, no entirely satisfactory technique has been developed for providing such comparable instant food products that will not deteriorate over extended periods of time.

Heretofore in drum drier process lines, if the temperature in the drum drier was sufficiently high to reduce the moisture content to a low enough level to permit the material to be disintegrated efficiently and also provide a maximum shelf life, it was so high that it destroyed or seriously impaired the flavor, color or nutritive content of the product. The result in either case was a reconstituted food product that departed from the original in at least one of the basic characteristics, i.e., consistency, flavor, color or nutritive content.

One line of attack on the dual problem has been to reduce the time during which sheets of puree are in contact with the drums since minimum contact decreases the tendency toward scorching and other taste affecting phenomena. This type of effort has been supplemented by the use of auxiliary or terminal drying apparatus which reduces the moisture content of the product to a level low enough to permit disintegration without forming lumps or causing caking. Such a process is disclosed and claimed in copending joint application, Serial No. 35,011, filed on June 9, 1960, now Patent No. 3,147,173. A number of other inventions have followed with the same problem to be solved as a goal.

These inventions have distinctly improved the similarity between the food prdoucts before processing and after processing and reconstituting, yet no one of them provides a drum drying line which produces an instantly reconstitutable product which, in virtually every respect, is comparable to the original product as to flavor, color, nutritive content and consistency and also has a long shelf life. The present invention, however, combines aspects of these developments and various refinements to obtain an improved processing line that produces an instantly reconstitutable food product of the highest quality.

One aspect of the present method is practiced by suitably adapting a conventional drum drying apparatus. Optionally, an inert nonoxidizing atmosphere is employed therewith. Temperatures at various points in the process line are judiciously selected to improve the moisture elimination and assure proper product disintegration.

This aspect of the invention is particularly adapted to the drying of high sugar content foods such as fruit. In order to further improve the reconstitutable high sugar content food a thickening agent is employed in combination with a puree or slurry of the food. This has the effect of improving the film forming characteristics of the product and partially nullifies the adverse effect of high sugar content in the food.

The thickening agent employed in the preferred embodiment of the present invention is one selected from the group of hydrophilic or lyophilic food colloids. Examples of hydrophilic colloids are starch, agar, gum arabic, gum acacia, carragheen, pectin, dextran, gelatin, sodium gluten, sulphate, etc. In the preferred embodiment of the invention, proportions of one to five percent by weight of a suitable colloid, as compared to slurry weight, are employed in the slurry of fruit or vegetable solids and water. The actual percentage of the thickening agent depends upon the colloid selected and on the percentage of fruit solids in the puree.

A typical example of a fruit puree is one including 15–25% total solids to water, which total solids include 1–5% of a suitable thickener and 50–90% fruit solids. While it might be possible to employ higher proportions of solids to water, thereby reducing the amount of water which must be dehydrated during the processing, to do so would necessitate the use of puree concentrate. Then, too, the increase in solid content would make the application of puree to the drum driers more difficult and perhaps have other adverse effects on the film sheet formation.

The incorporation of a thickening agent results in a better rehydration because it absorbs some of the water which should be absorbed by the dry product. It is a fact that in dehydrating any food product—whether fruit, vegetable or otherwise—there is a loss of a portion of the gel characteristic of the plant or animal tissue, which portion is unrecoverable. Stated in another way, the process from natural product to rehydrated product is not without loss. As a result, when a good product is rehydrated, its consistency has a higher liquid content than that of the original product. The addition of a suitable amount of a colloidal thickener acts to absorb some of the water added during rehydration and permits the reconstituted food to more closely approximate the original from which it was derived.

Turning to the dehydrating part of the process, it is equally suited to being practiced with or without the use of an inert gas atmosphere at any of its stages. However, where desired an inert gas such as nitrogen or a process gas including nitrogen and carbon dioxide or in some cases superheated steam, the latter of which acts like an inert gas, may be employed. By using inert gas at the places to be described hereinafter, it is possible to assist in preventing oxidation and control of scorching of the product. A satisfactory product is obtained, however, in the absence of the inert gas.

The remainder of the processing line from the drum drier to packaging is enclosed in a relatively cold inert gas atmosphere to improve the quality and output of the food processing line. More particularly, in the preferred embodiment a supply of refrigerated gas is played on the film sheet product as it leaves the drum driers. This chills the sheet to reduce its plasticity and improve it for the flaking steps. The flaking and packaging steps are also maintained in the relatively cool inert gas atmosphere to prevent the ingress of oxygen and to maintain low plasticity.

In accordance with the present method of processing a high sugar content food, the puree or slurry, including approximately 10–23% (50–90% of the 15–25% solids) of fruit solids suspended in water, is mixed in a tank with the proper amount of thickening agent. The slurry is fed from the mixing tank into a gellation tank in which it is heated with agitation to a temperature in the range of 160–220° F. so as to fully gel and activate the thickening agent preparatory to metering the slurry to drum driers. Specifically, the slurry after the thickener has gelled is fed into a holding tank from whence it is metered into the drum drier. The slurry is metered onto the drums of the drier in an atmosphere of hot inert gas. The film of the food product formed on the drums is peeled off by doctor blades and fed through take-away screws where the sheet is cooled by relatively cool nitrogen to temperatures between about 40–70° F. After the sheet has been cooled to improve its handling properties, it is directed through a flaker to a storage bin and ultimately to a packaging station—all while maintaining the cool ambient temperature.

External to the enclosed drier, chill screw, flaker, storage bin and packaging station is a gas supply and temperature control means therefor to provide hot and cold nitrogen to the drum drier and chill screw, respectively. The entrained nitrogen may be evacuated both above and below the nip of the drums, and pumped back to the gas supply for moisture removal preparatory to heating and recycling in the system.

The preferred aspect of the present invention carries the foregoing process forward a step toward the ideal, instantly reconstitutable food that is desired. In spite of the fact that the improved process described above has eliminated a number of serious problems, the problem of removing all moisture at the drum drier stage is still present.

The preferred aspect contemplates an instant food process line in which the steps employed are similar to the above sequence until the material is removed from the flaker or flaking mill. At this point it has been found advantageous to modify the process. The relatively dry, flaked or powdered product is moved through a relatively fine mesh screen, e.g., 20 to 40 mesh, and then deposited in a fluidized bed type of drier which includes a moisture control element and cooling bed. The product has further moisture removed from it in the terminal drier at a substantially lower temperature as compared to the drum drier. The product is then centrifugally separated and packaged for distribution.

The preferred aspect has found application not only in the processing of high sugar content foods but with the usual low sugar content foods, such as cereals, soups and in some cases certain fruits as well. The addition of seasoning to the soups and certain vegetables is purposely added at the packaging terminus in order to conserve their volatile flavor content. This process permits an instantly reconstitutable food product to be formed which closely approximates the original product upon reconstitution by adding water and, at the same time, one which has a long shelf life.

In the case of high sugar content foods, e.g., fruits, it is generally desirable to remove as much moisture from the instant product as possible, whereas in the case of the lower sugar content foods, e.g., cereals, soups, etc. it is more important to control the moisture content. These different objectives provide products in every case which have good organoleptic stability. The practical lower limit for moisture content when the food product leaves the drum drier is in the range of three to six percent, which level avoids degrading the reconstituted attributes of the product due to excessive heat. The desirable end-product moisture content in the case of high sugar content foods is as far below this figure as possible, consistent with economics. On the other hand, in the case of the low sugar content products, it is necessary to select that particular moisture content which is optimum for the specific product. Most soups, and certain vegetables, have optimum moisture levels. Values above and below the optimum reduces the organoleptic stability of the product.

In one investigation, a slurry of prunes was processed and the moisture content reduced to approximately 3½% with particularly salutary results. Other types of food products naturally require somewhat different processing times and temperatures in the terminal drier in order to obtain different optimum moisture contents.

The improved process herein disclosed in common with the earlier process described optionally utilizes an inert gas such as nitrogen or some combination thereof, including carbon dioxide, to provide the heated atmosphere in the drum drier as well as relatively cool inert gas to reduce the temperature of the sheets of material in the chill screw conveyor and flaking mill. (Air would be a suitable alternative to the inert gas.)

Heated inert gas may also be employed to further reduce the moisture content of the food product in the moisture controller section of the terminal drier. In a typical situation wherein prunes are processed, hot nitrogen is supplied to the moisture controller at approximately 160° F. and the material moves through the controller at a rate sufficient to create a bed temperature of approximately 120° F. The actual bed temperature, i.e., the equilibrium temperature of the product, can be varied between 115-150° F. or so depending upon the particular food product being processed. It can be appreciated that the relatively low temperatures maintained in the moisture controller permit further moisture removal without the deleterious effects upon the flavor, color or nutritive content of the food product. The cooling bed, which may also be a cool gas stream or equivalent thereof, reduces the temperature prior to depositing it in a centrifugal separator for separation prior to packaging. In the present process inert gas optionally is maintained in the terminal drier as well as in the area surrounding the centrifugal separator and packaging stations to prevent oxidation from degrading the desired attributes of the product.

The drawing illustrates the practice of both aspects of the invention. The puree or slurry of fruit or other type of solids and water is fed into a mixing tank 10. There the slurry is thoroughly mixed with a supply 11 of colloidal thickener and passed into the gelation tank 13 where heat, for example in the range of 160–220° F., is applied to the mixture in order to activate the thickening agent. Sufficient agitation is used with the heat to achieve the gelling. The slurry-colloidal mixture is thereafter pumped into a holding tank 16 and metered onto the drums of drier 17.

The slurry is deposited in the nip of the drums and as the drums rotate the product sheets on the surfaces of the drums are removed by doctor blades (not shown) and deposited on the chill screw conveyor 18. The product is moved from the chill screw conveyor 18 into the flaking mill and screener 19 which crumbles the relatively dry product into a pulverized material. (If the preferred method is used, the following steps are used. Otherwise the pulverized product is sent directly to the packaging station 27.) The pulverized product is moved from the flaking mill 19 into the terminal drier 21 which includes a moisture controller 22 and a cooling bed 23. From the terminal drier 21, the further dehydrated product is directed through a centrifugal separator 26 to packaging station 27. A seasoning supply 28 is provided for adding any necessary seasoning to soups and certain vegetables at the packaging station 27.

A temperature control means 31 and inert gas supply 32 are situated external to the process line and cooperate to provide inert gas atmospheres of the proper temperatures to the drum drier 17, the chill screw 18 and flaking mill and screener 19, the terminal drier 21, and the separator 26 and packaging station 27. The temperature control 31, for example, supplies hot nitrogen to the drum drier 17 (approximately 250° F.) and a relatively cool nitrogen to the chill screw and flaking mills 18 and 19 (0–40° F.). The temperature control 31 also provides hot nitrogen at approximately 160° F. for the moisture controller 22 in order to permit the bed temperature of the product therein to reach a desired temperature range. Temperature control 31 also provides a relatively cool inert gas for the cooling bed 23 which reduces the product temperature to approximately room temperature and finally, temperature control 31 provides warm inert gas to the separator and packaging stations 26 and 27, respectively, to assure that the entire process from the drum drier onward is carried out in an inert gas atmosphere. Means (not shown) are provided to vary the temperatures supplied to these various units in order to permit the necessary variations in drum drier ambients, chill screw ambients and moisture controller ambients.

All of the components in the process line including the drum drier, chill screw and flaking mills, terminal drier, separator, and packaging stations have an exhaust 35 which may be connected to the inert gas supply 32 in order to recirculate the gas after removing the entrained moisture.

The terminal drier 21 includes a moisture controller unit 22 which is generally cylindrical in shape and includes a porous disk 36 supported in its lower end through which the inert gas is dispersed. The disk disperses the gas and raises its velocity whereby the incoming pulverized material is maintained on a floating bed. The powdered product is drawn into the moisture controller at a point 37 above the porous disk and the velocity of the nitrogen holds the powder away from the disk and thoroughly separates it to permit the elevated temperatures of the gas to dry the powder. An exhaust or outlet pipe 38 is connected to the other side of the moisture controller 22 at approximately the same level as the input 37 and the relatively drier powder spills into the outlet and is transported through a cooling bed 23 or other means to the separator and packaging stages.

As the pulverized material is agitated in the controller 22, additional moisture is removed. It should be noted that the cooling bed 23 may be simply a cold stream of inert gas or some other equivalent cooling means; any means by which the temperature is reduced to approximately room temperature will be satisfactory.

In the case of soups, peas and other products which require seasoning, it is added just before the products are packaged at station 27 in order to avoid loss of flavor volatiles.

The food under treatment is transported from one station to another by any suitable conveying means. For example, it is contemplated that the food particles obtained from the drum driers after flaking may be transported through pipes wherein the propulsion force is a vacuum applied to the piping at a suitable point, or a gas (insert or otherwise) under pressure applied to the piping at a suitable point.

Regardless which of the processes above described are used, activation of the thickening agent is essential. It is accomplished by using sufficient heat and agitation to gel the same prior to deposition of the slurry on the drum drier. To illustrate the importance of this step the following food preparations were made using the general techniques herein described and modified as noted below.

(1) A slurry of apricots containing about 17–20% solids was prepared and about 5% by weight (based on the finished reconstituted product) of the slurry of modified tapioca thickening agent was added thereto. The slurry with the thickening agent was heated with agitation at about 200° F. for about 10 seconds thereby causing the tapioca to gel. The material was then applied onto two drum driers (12" diameter, 36" long) by forming relatively low puddles (about 3½ inches) in the upper nip of the drums while the drums were rotated. Steam at about 230° F. in the drums caused the material applied on the surfaces thereof to be dried into a sheet. Residence time in the puddle and on the drums was about 2½ minutes. The dried sheet was thereafter stripped from the drums, chilled with cool nitrogen, and flaked. The flaked material was terminally dried on a fluidized bed using nitrogen.

(2) The above procedure was repeated at the same 3½ inches slurry height except that the apricot slurry containing the tapioca was applied directly to the drums without the preheating step for gelling the thickening agent. The material on the drums dried but failed to form a continuous workable sheet, the slurry drying in a relatively spotty pattern. The final product had an ungelatinized starchy aftertaste.

The sheet obtained from the first procedure (where preheating and gelling was employed) yields a most satisfactory and desirable product which retains substantially all of the natural flavoring and essence of the product and does not have a starchy aftertaste when reconstituted. This is due in part to the low puddle from which the slurry is fed to the drums and to the short residence time of the slurry on the drums, both of which help avoid burning or scorching of the product from excessive heating on the drums while the preheating step insures gelation.

It is possible to obtain a continuous sheet where no preheating and pregelation of the thickening agent is employed through use of a relatively high puddle of 5 inches and longer residence time of 6 minutes on the drum driers. In this case the flavor of the end product is adversely affected by the excessive heat contact which causes excessive loss of volatile flavor factors and some scorched flavor is noted.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for processing foods to obtain a dehydrated instantly reconstitutable product comprising: forming a slurry of high sugar content food with about .5–5% of a thickening agent, heating the slurry to about 160–200° F. with agitation to gel the thickening agent, then forming a sheet with the slurry on a drying surface, heating the sheet on said surface to dehydrate the sheet, and then removing the dried food from said surface as a continuous sheet.

2. A method in accordance with claim 1 wherein said drying surface is a drum dryer.

3. A method for processing foods to obtain a dehydrated instantly reconstitutable product comprising: forming a slurry of high sugar content food with about .5–5% of a thickening agent, heating the slurry to about 160–200° F. with agitation to gel the thickening agent, then forming a sheet with the slurry on a drying surface, heating the sheet on said surface to dehydrate the sheet to a moisture content not less than about 3–6%, then removing the dried food from the surface as a continuous sheet, cooling and flaking the removed sheet, and further dehydrating the flaked sheet by subjecting it to a forced draft of high temperature, inert gas for a time sufficient to heat the product to about 115–150° F. to reduce the moisture content of the flakes below 3–6% to an optimum level determined by the characteristic of the food being processed.

4. A method for processing high sugar content foods to obtain a dehydrated instantly reconstitutable product comprising: forming a slurry of said food together with about .5–5% of a thickening agent, heating said slurry to about 160–220° F. with agitation to fully activate the thickening agent, then coating the slurry on a drum dryer, heating the slurry on the drum dryer in an inert atmosphere to dehydrate the slurry and thereby form a dried sheet on the drum, removing the dried sheet in a continuous form from the drum dryer, chilling the removed sheet with a refrigerated inert gas, and disintegrating the chilled sheet in an inert gas atmosphere.

References Cited by the Examiner
UNITED STATES PATENTS

| | | | |
|---|---|---|---|
| 1,977,945 | 10/34 | Jameson et al. | 99—206 |
| 2,061,188 | 11/36 | Cowgill | 99—204 |
| 3,009,815 | 11/61 | Lorant et al. | 99—204 |

A. LOUIS MONACELL, *Primary Examiner.*